(12) United States Patent
Wiacek

(10) Patent No.: US 12,177,806 B2
(45) Date of Patent: Dec. 24, 2024

(54) TIME OF ARRIVAL BASED UPLINK CHANNEL SYNCHRONIZATION

(71) Applicant: Nokia Technologies Oy, Espoo (FI)

(72) Inventor: Fabian Wiacek, Warsaw (PL)

(73) Assignee: Nokia Technologies Oy, Espoo (FI)

( * ) Notice: Subject to any disclaimer, the term of this patent is extended or adjusted under 35 U.S.C. 154(b) by 296 days.

(21) Appl. No.: 17/630,328

(22) PCT Filed: Sep. 6, 2019

(86) PCT No.: PCT/US2019/050103
§ 371 (c)(1),
(2) Date: Jan. 26, 2022

(87) PCT Pub. No.: WO2021/045788
PCT Pub. Date: Mar. 11, 2021

(65) Prior Publication Data
US 2022/0264497 A1    Aug. 18, 2022

(51) Int. Cl.
*H04W 56/00* (2009.01)
*H04W 76/20* (2018.01)

(52) U.S. Cl.
CPC ....... *H04W 56/005* (2013.01); *H04W 56/001* (2013.01); *H04W 76/20* (2018.02)

(58) Field of Classification Search
None
See application file for complete search history.

(56) References Cited

U.S. PATENT DOCUMENTS

| 11,363,545 | B2 * | 6/2022 | Heyn | ............... H04B 7/18508 |
| 2011/0002310 | A1 | 1/2011 | Mori et al. | |
| 2014/0148186 | A1 | 5/2014 | Zhou et al. | |

(Continued)

FOREIGN PATENT DOCUMENTS

| CN | 102474836 A | 5/2012 |
| CN | 103167574 A | 6/2013 |

(Continued)

OTHER PUBLICATIONS

Office action received for corresponding Chinese Patent Application No. 201980099897.9, dated Jan. 19, 2024, 8 pages of office action and no page of translation available.

(Continued)

*Primary Examiner* — Willie J Daniel, Jr.
(74) *Attorney, Agent, or Firm* — Nokia Technologies Oy

(57) ABSTRACT

A method, apparatus, and a computer-readable storage medium are provided for using time of arrival (TOA) based $T_{TOAVAL}$ or $T_{TOA}$ value for uplink to downlink channel synchronization at a user equipment (UE) required for required for establishing an RRC connection and/or maintaining the RRC connection due to UE mobility. In an example implementation, the method may include determining, by a user equipment (UE), a first time of arrival (TOA) based timing advance index value; and performing, by the user equipment (UE), uplink channel synchronization based at least on the first time of arrival (TOA) based timing advance index value.

16 Claims, 12 Drawing Sheets

(56) References Cited

U.S. PATENT DOCUMENTS

| | | | |
|---|---|---|---|
| 2016/0050635 | A1 | 2/2016 | Choi et al. |
| 2018/0084546 | A1 | 3/2018 | Guo et al. |
| 2021/0219329 | A1 | 7/2021 | Zhou et al. |
| 2022/0210816 | A1 | 6/2022 | Wu et al. |
| 2022/0217788 | A1 | 7/2022 | Ohara et al. |

FOREIGN PATENT DOCUMENTS

| | | | |
|---|---|---|---|
| CN | 104798413 | A | 7/2015 |
| CN | 108834211 | A | 11/2018 |
| CN | 109792700 | A | 5/2019 |
| EP | 2391159 | A1 | 11/2011 |
| EP | 2728946 | A1 | 5/2014 |
| EP | 3447936 | A1 | 2/2019 |
| WO | 2010/083780 | A1 | 7/2010 |
| WO | 2020/001731 | A1 | 1/2020 |
| WO | 2020/001821 | A1 | 1/2020 |
| WO | 2020/200393 | A1 | 10/2020 |

OTHER PUBLICATIONS

"3rd Generation Partnership Project; Technical Specification Group Radio Access Network; UTRAN Iub/Iur interface user plane protocol for DCH data streams (Release 10)", 3GPP TS 25.427, V10.1.0, Jun. 2011, pp. 1-48.

"Timing Advance Adjustments for Satellite Communications (NTN)", 3GPP TSG RAN WG1 Meeting, RAN1#96, R1-1903051, Agenda: 7.3, Fraunhofer IIS, Feb. 25-Mar. 1, 2019, 4 pages.

"3rd Generation Partnership Project; Technical Specification Group Radio Access Network; Evolved Universal Terrestrial Radio Access (E-UTRA); Physical layer; Measurements (Release 15)", 3GPP TS 36.214, V15.3.0, Sep. 2018, pp. 1-25.

"3rd Generation Partnership Project; Technical Specification Group Radio Access Network; Evolved Universal Terrestrial Radio Access (E-UTRA); Physical layer procedures (Release 15)", 3GPP TS 36.213, V15.5.0, Mar. 2019, pp. 1-552.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.4.0, Dec. 2018, pp. 1-131.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.4.0, Dec. 2018, pp. 1-363.

"3rd Generation Partnership Project; Technical Specification Group Radio Access Network; Evolved Universal Terrestrial Radio Access (E-UTRA); Physical channels and modulation (Release 15)", 3GPP TS 36.211, V15.5.0, Mar. 2019, pp. 1-238.

"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.1.0, Mar. 2019, pp. 1-3585.

"3rd Generation Partnership Project; Technical Specification Group Radio Access Network; Solutions for NR to support non terrestrial networks (NTN) (Release 16)", 3GPP TR 38.821, V0.4.0, Mar. 2019, pp. 1-46.

"3rd Generation Partnership Project; Technical Specification Group Radio Access Network; Feasibility study for Further Advancements for E-UTRA (LTE-Advanced) (Release 15)", 3GPP TR 36.912, V15.0.0, Jun. 2018, pp. 1-62.

International Search Report and Written Opinion received for corresponding Patent Cooperation Treaty Application No. PCT/US2019/050097, dated May 29, 2020, 13 pages.

"Considerations on Doppler Compensation, Uplink Timing Advance and Random Access in NTN", 3GPP TSG RAN WG1 Meeting #98, R1-1908250, Agenda: 7.2.5.3, Nokia, Aug. 26-30, 2019, pp. 1-21.

International Search Report and Written Opinion received for corresponding Patent Cooperation Treaty Application No. PCT/US2019/050103, dated Jun. 8, 2020, 13 pages.

"On UE timing related requirements in LTE high speed scenario", 3GPP TSG-RAN WG4 Meeting #90bis, R4-1902986, Agenda: 7.15.2, Intel Corporation, Apr. 8-12, 2019, pp. 1-5.

"Timing Advance Adjustments for Satellite Communications (NTN)", 3GPP TSG RAN WG1 Meeting, RAN1#96bis, R1-1904225, Agenda: 7.2.5.3, Fraunhofer IIS, Apr. 8-12, 2019, 4 pages.

Office action received for corresponding Chinese Patent Application No. 201980098864.2, dated Feb. 27, 2024, 6 pages of office action and no page of translation available.

Office action received for corresponding European Patent Application No. 19773294.4, dated Mar. 28, 2024, 7 pages.

Non-Final Office action received for corresponding U.S. Appl. No. 17/630,305, dated May 15, 2024, 14 pages.

Office action received for corresponding European Patent Application No. 19773294.4, dated Jul. 31, 2024, 6 pages.

\* cited by examiner

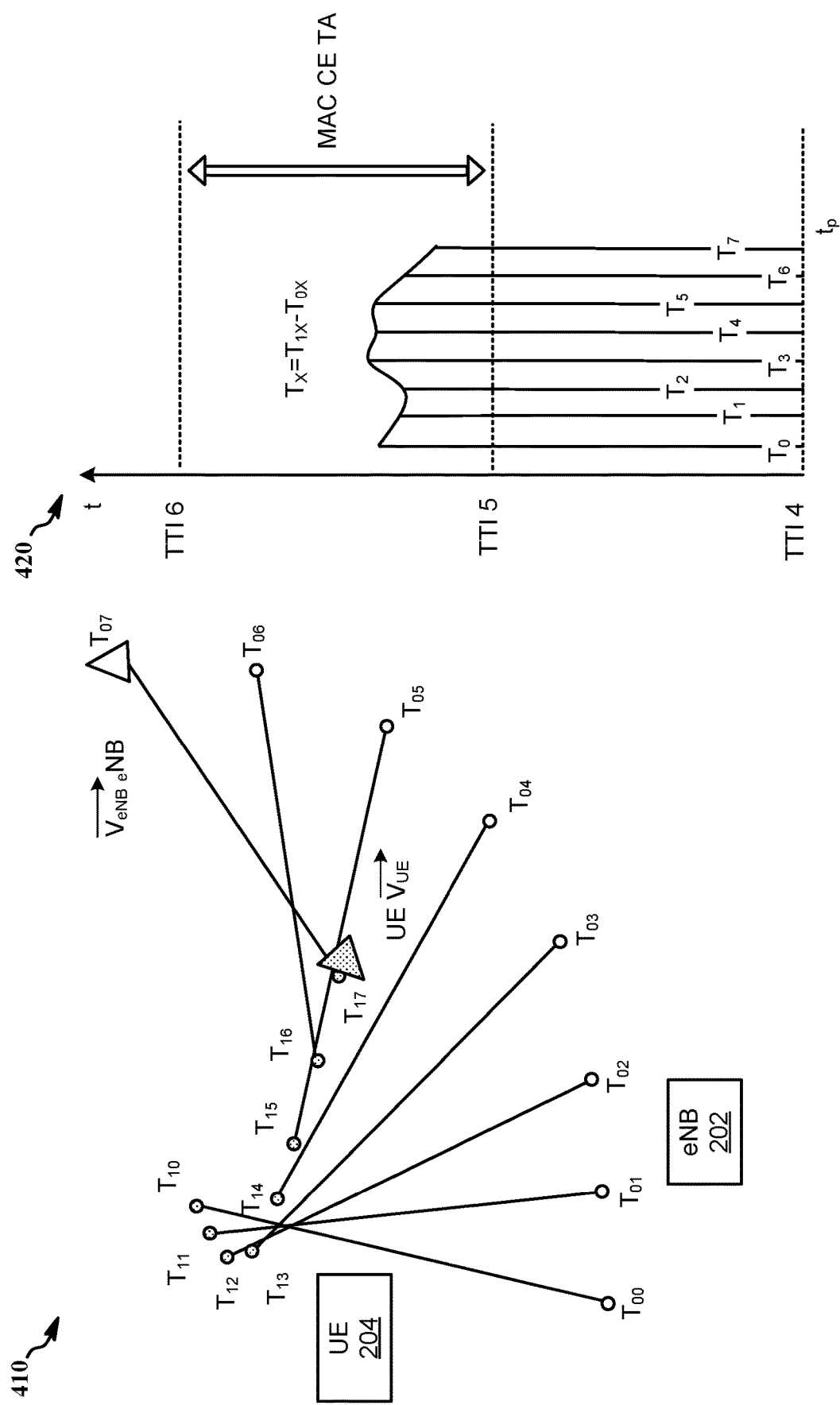

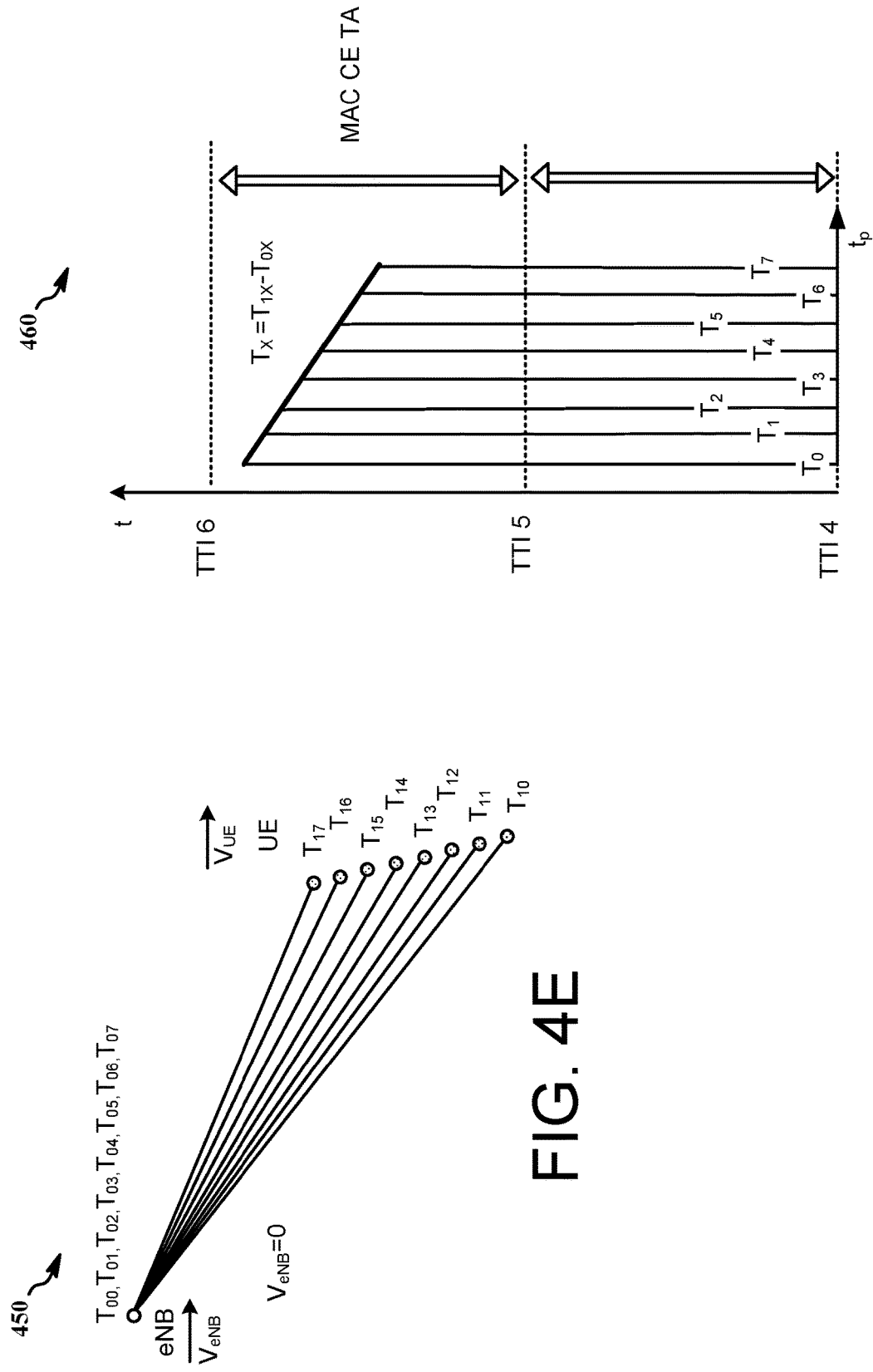

TIME OF ARRIVAL BASED UPLINK CHANNEL SYNCHRONIZATION

RELATED APPLICATION

This application was originally filed as PCT Application No. PCT/US2019/050103 on Sep. 6, 2019, each of which is incorporated herein by reference in its entirety.

CROSS-REFERENCE TO RELATED APPLICATIONS

This application is related to International Application No. PCT/US2019/050097, filed on Sep. 6, 2019, the disclosure of which is incorporated by reference herein in its entirety.

TECHNICAL FIELD

This description relates to wireless communications, and in particular, to synchronous wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and a computer-readable storage medium are provided for time of arrival (TOA) based uplink channel synchronization.

In an implementation, an example method may include determining, by a user equipment (UE), a first time of arrival (TOA) based timing advance index value; and performing, by the user equipment (UE), uplink synchronization based at least on the first time of arrival (TOA) based timing advance index value.

In another implementation, an example method may include determining, by a network node, a first timing advance (TA) correction value; receiving, by the network node, a first time of arrival (TOA) based timing advance index value from a user equipment (UE); and validating, by the network node, the first time of arrival (TOA) based timing advance index value received from the user equipment (UE), the validating based at least on comparing the first time of arrival (TOA) based timing advance (TA) index value and the first timing advance (TA) value.

BRIEF DESCRIPTION OF THE DRAWINGS

FIGS. 4A-4H illustrate $sT_X(X)$ function in various scenarios, according to some example implementations.

DETAILED DESCRIPTION

Figure 1:
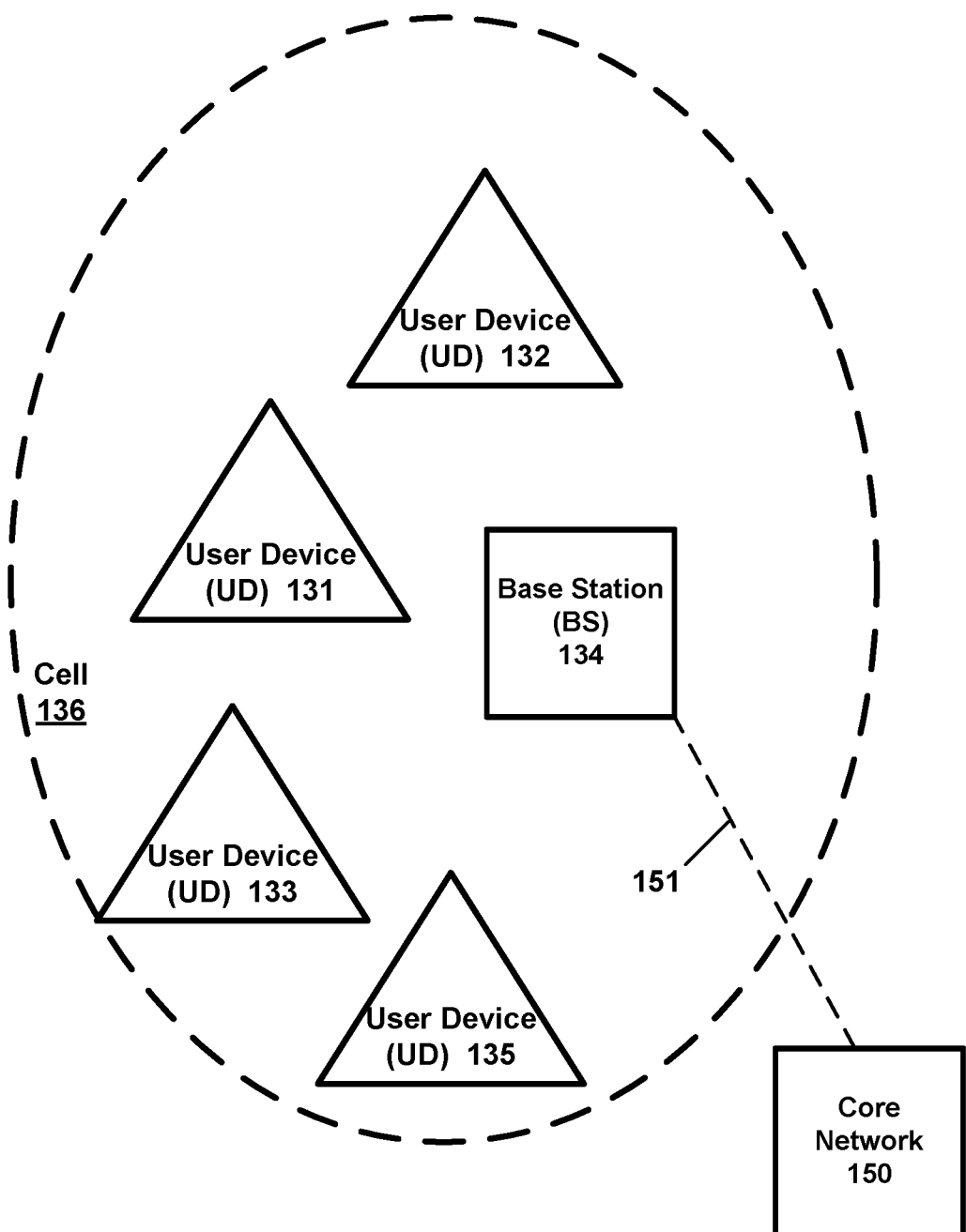
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In synchronous wireless communications, for example, LTE, 5G/NR, etc., a timing advance (TA) correction index value and/or update(s) provided by a network node (e.g., a base station) are essential for synchronizing uplink transmissions as downlink transmissions are used by a user equipment (UE) as a reference for the uplink transmissions. Without such a synchronization mechanism, the UE may not be able to access network resources to transmit data using uplink channel(s).

A base station (e.g., eNB, gNB, etc.) may calculate a TA correction index value (e.g., an initial TA correction index value) and share the TA correction index value with a UE via a TA command during a random access (RA) procedure initiated by the UE. For example, the TA command may be a part of a RACH response (e.g., Msg2 of a four-step random procedure or MsgB of a two-step random access procedure). In addition, the base station may update the TA correction value (or update the initial TA correction value) via a medium access control (MAC) control element (CE) update procedure, as defined in 3GPP Specifications (e.g., 3GPP 36.214).

In terrestrial wireless communication systems (e.g., ground based wireless communication networks), lower UE speeds may allow for proper application of TA correction index value and/or MAC CE updates without significant signaling overhead. For example, in LTE, 1 TA is approximately 78 meters and the UE needs to be at/below a speed of 280.8 kms/hr in or against the direction of a base station antenna system to receive one MAC CE TA update in 1 second. For example, for a LTE signal frame size of 10 ms, a MAC CE TA update is applied in 1 out of 100 frames and other 99 frames may be used for other signaling or data transmissions.

However, in high-speed/very high-speed scenarios, the UE or base station (or both of them) may be in motion. In such scenarios, additional TA correction values may be needed. But, the additional TA correction values may require more downlink radio resources for maintaining synchronization at the UE. In some more such scenarios, for example, in non-terrestrial network (NTN) applications, a satellite with a base station (e.g., a satellite cell) may be moving at a speed of 7.5 kms/s (e.g., 27,000 kms/hr) and for a UE with a speed of 0 km/s (e.g., a stationary UE), approximately 96 MAC CE TA updates per second may be needed to maintain the required synchronization, for example, synchronization based on 3GPP LTE standards as described above.

Therefore, there is desire/need to efficiently apply TA correction values if motion patterns of high-speed base station and/or UE are not known, the relative speeds of base station and/or UE are rapidly changing, and/or when the position of base station and/or UE are not known.

The present disclosure describes the use of time of arrival (TOA) based $T_{TOAVAL}$ or $T_{TOA}$ value for uplink to downlink channel synchronization at a user equipment (UE) required for establishing an RRC connection and/or maintaining the RRC connection due to UE mobility. In an example implementation, the method may include determining, by a user equipment (UE), a first time of arrival (TOA) based timing advance index value; and performing, by the user equipment (UE), uplink channel synchronization based at least on the first time of arrival (TOA) based timing advance index value.

Figure 2A:
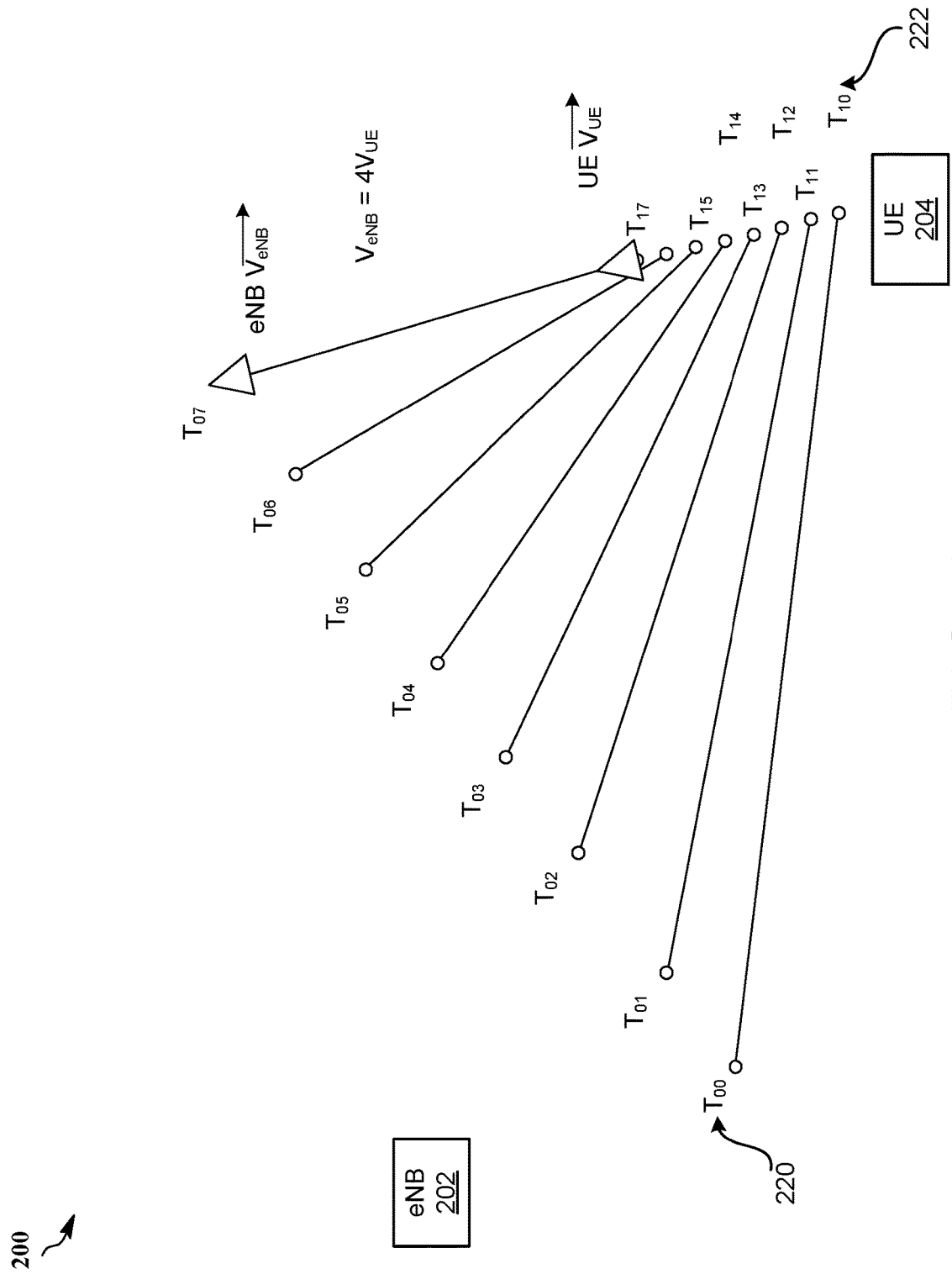
FIG. 2A illustrates signal propagation delay characteristics for a high-speed example scenario, according to an example implementation.

FIG. 2A illustrates signal propagation delay characteristics 200 for a high-speed example scenario, according to an example implementation. In an example implementation, for example, two high-speed nodes, e.g., eNB 202 and UE 204, may establish a wireless connection, eNB 202 being a serving cell of UE 204.

In some implementations, for example, eNB 202 may be moving much faster than UE 202. For example, the eNB may be moving at 4× the speed of the UE (e.g., $V_{eNB}$=4 $V_{UE}$). This is an example implementation and not a limitation as the eNB and/or UE may move with different speeds in other example implementations. The speeds at which the nodes are moving and/or the pattern motions have illustrative character.

As illustrated in FIG. 2A, eNB 202 may broadcast information (e.g., continuously) containing the time a signal is physically transmitted, To (e.g., time of physical transmission of the signal or signal physical transmission time) from eNB 202. The signal transmitted from the eNB may be a signal frame, sub-frame, symbol, etc., and may be used by the UE as a reference signal for measurement of signal propagation delay. In some implementations, for example, the selection of the signal granularity (e.g., frame or sub-frame or symbol) by the UE may be based on maximum range and/or required update rate for time of arrival (TOA) based measurements.

For instance, in 1 millisecond a distance of 300 km is travelled by light or any other microwave signal. If reference signal is sent every 1 millisecond, in a cell with range of 300 kms, this reference signal may be the only reference signal. This may ensure unambiguity as only this one value may be present in the cell for the entire range. If we decrease this period, e.g., to 0.5 millisecond (~ distance 150 kms) there may be 2 such signals within the cell range (300 kms). It may result in ambiguity. This issue is important when we consider how $T_0$ value should be reported, e.g., the format: HH:MM:SS:MS:US:NS. This may be shortened to US:NS if reference signal is sent unambiguously (e.g., 1 millisecond in 300 kms cell range) or MS:US:NS if more frequent updates are required.

In addition, this may be related to relative motion patterns, as illustrated for example, in FIGS. 4A-H. For example, if the relative distance between UE and eNB has linear representation (e.g., FIG. 4F), the update rate may be lower as UE may still predict/calculate necessary timing adjustment. However, if the motion pattern has non-linear (e.g., FIG. 4D) or unpredictable characteristics (e.g., FIG. 4B), more frequent updates may be needed, as calculations or predictions may not be valid or correct for longer periods.

Moreover, a UE may also use as reference other signals than those containing $T_0$. This may be possible as LTE/5G frame structure is synchronous. For example, LTE frame (10 milliseconds) is exactly 307200 $T_s$ and UE may just add 307200 $T_s$ to the last received frame with $T_0$ to have most current value. Any difference in propagation delay may be also detected with such assumption. Thus, UE may change measurement granularity without the need for higher $T_0$ update rate ($t_P$) assuming that transmission is a synchronous transmission.

In some implementations, eNB 202 may broadcast a signal at pre-defined time periods $T_{00}$, $T_{01}$, $T_{02}$, etc., with an update time period of $t^P$. The broadcasted signal may be received, at UE 204, at time periods $T_{10}$, $T_{11}$, $T_{12}$, etc. In an example implementation, update time period $t_P$ may be the same between the broadcasted signals. In another example implementation, update time period $t_P$ may vary between the broadcasted signals (may be referred to as $t_P$ pattern). For example, the update time period $t_P$, for example, between $T_{00}$ and $T_{01}$ and $T_{01}$ and $T_{02}$ may be equal (e.g., 5 ms) or it may vary (e.g., 5 ms and 10 ms) and/or eNB 202 may inform UE 204 about the $t_P$ patterns. Moreover, in some implementations, for example, the broadcasting of the signal and/or $t_P$ patterns may be associated with system information block (SIB) transmissions, for example, system information block 16 (SIB16) which is also used for Global Positioning System (GPS) related information (or satellite-related positioning information).

In an example implementation, the signal emitted (e.g., transmitted) by eNB 202 at time $T_{00}$ 220 may be received by UE 204 at time $T_{10}$ 222 and the data (e.g., $T_{00}$ and $T_{10}$) may be latched (e.g., saved, stored, etc.) at UE 204, for example, in an associated UE register. The difference between $T_{10}$ and $T_{00}$ (e.g., $T_{10}$-$T_{00}$) may correspond to (or considered as) signal propagation delay, $T_X$ (e.g., microwave signal propagation delay) as shown by, for example, [Eq. 1] below, assuming that the processing times at eNB 202 and/or UE 204 are stable and/or may be compensated. For example, in [Eq. 1], $T_X$ represents propagation delay time for sample X, $T_{0X}$ represents transmission time of sample X at eNB 202 and $T_{1X}$ represents reception time of sample X at UE 204.

$$T_X = T_{1X} - T_{0X} \qquad [\text{Eq. 1}]$$

Figure 2B:
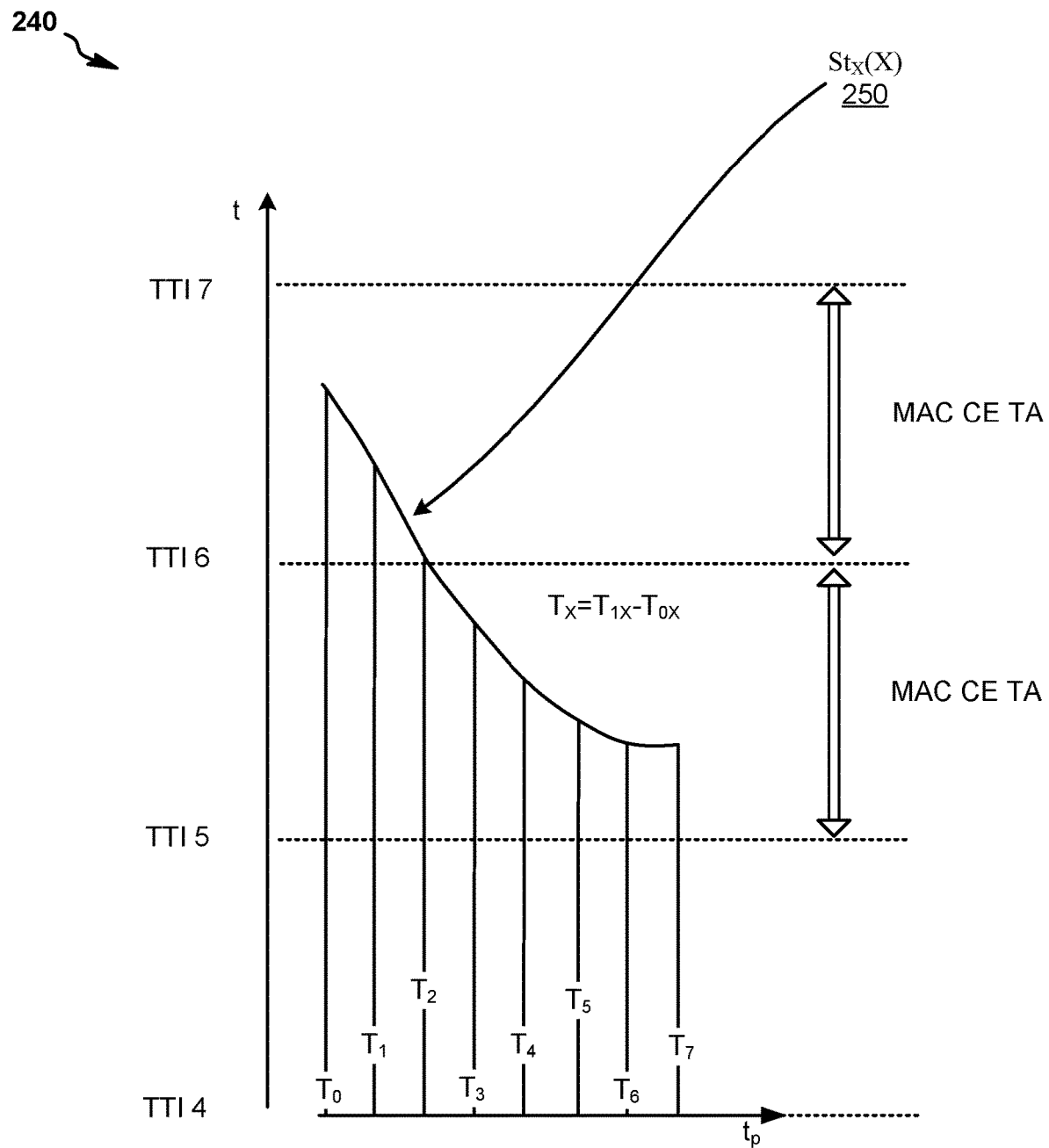
FIG. 2B illustrates signal propagation delay characteristics as a function of time, according to an additional example implementation.

FIG. 2B illustrates signal propagation delay characteristics 240 as a function of time, according to an additional example implementation.

In some implementations, propagation delays (or propagation delay times) may change as a function of time and/or may depend on relative motion patterns of the nodes (e.g., speed/heading of eNB/UE) when the nodes (e.g., eNB 202/UE 204) are in motion. FIG. 2B illustrates how propagation delay $T_X$ changes in time domain in an example implementation. For example, $T_X$ may be expressed in terms of transmission time interval (TTI) scale for providing information about relative distance between the nodes (eNB/UE) with respect to radio resource control (RRC) signaling. In FIG. 2B, a TTI of 1 ms is used for illustration/explanation purposes (and not as a limitation).

In an example implementation, the changes in propagation delay may be expressed as a function of time, for example, as shown in [Eq. 2] below, where $sT_X(X)$ 250 represents speed of distance change for sample X, $T_X(X)$ represents propagation delay time for sample X at $t_P$, and $T_{X-1}(X-1)$ represents propagation delay for sample X-1, where time X=(X-1)+$t_P$.

$$sT_X(X) = T_X(X) - T_{X-1}(X-1) \qquad [\text{Eq. 2}]$$

In other words, 240 of FIG. 2B represents function $sT_X(X)$ which may illustrate how signal propagation delay varies with respect to update time period $t_P$ and/or characteristics of the relative movements of the nodes.

Figure 2C:
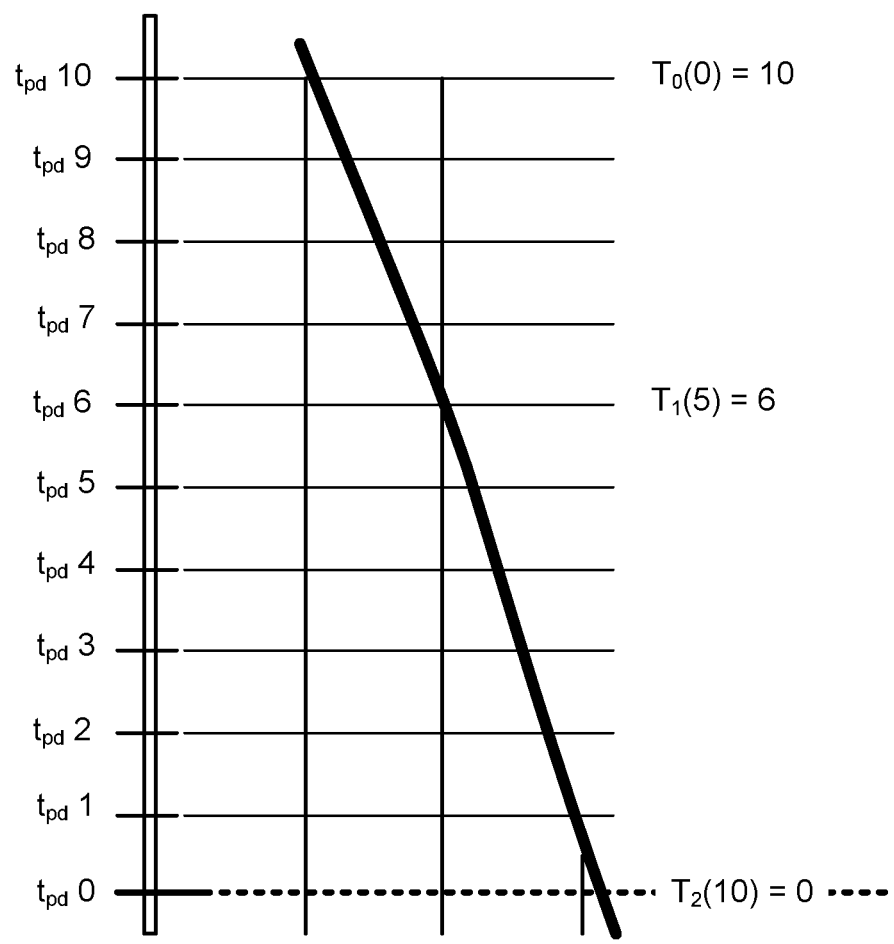
FIG. 2C illustrates signal propagation delay characteristics, according to another additional example implementation.

FIG. 2C illustrates signal propagation delay characteristics 280, according to an additional example implementation. A more detailed view for $sT_X(X)$ characteristics is illustrated in FIG. 2C.

For example, in FIG. 2C, the axis related to propagation delays may be scaled and expressed as $t_{Pd}X$ values. In some implementations, for example, $t_{Pd}X$ values may correspond to TA unit values for a given standard as specified by, for example, [Eq. 3] below.

$$1\ t_{Pd}X = 1/2\ TA \qquad [\text{Eq. 3}]$$

In some implementations, for example, using data from FIG. 2B, a speed of distance change between eNB 202 and UE 204 may be calculated as shown below in [Eq. 4].

$$t_1(1) = \qquad [\text{Eq. 4}]$$
$$T_1(1) - T_0(0) = T_1(5\ \text{ms}) - T_0(0\ \text{ms}) = 6\ t_{Pd} - 10\ t_{Pd} = -4\ t_{Pd}$$

That is, as shown in FIG. 2C, within one $t_P$ period, which may be 5 ms, relative distance between eNB 202 and UE 204 decreased by 4 $t_{Pd}$, which for this example implementation may mean approximately 156 m (e.g., equivalent to 2 TAs for LTE). Considering that during 5 ms, a distance of approximately 1500 kms may be travelled by a microwave signal, unambiguity may be achieved within such range. In some implementations, other means of coding (e.g., mode interlace pattern, different coding, different carrier frequency, etc.) may be considered to extend this period and/or keep unambiguity continuous.

Further, as illustrated in FIG. 2C, a UE provided with TOA data (e.g., signal physical transmission ($T_0$) time and TOA reference data update rate (e.g., $t_P$)) may be able to measure signal propagation delays which in turn may be used for relative distance assessments. Assuming that microwave speed is constant for microwave signals, such distance may be used to calculate TA values (or TA drift). In an example implementation, a pattern $sT_X(X)$ may be determined, especially for frequent $t_P$ updates, which may enable prediction for objects (eNBs/UEs) moving at high-speed/very high-speed. For example, in a fast-moving scenario, eNB TA-based synchronization mechanism may fail as provided TA values may be not up to date at the time of applicability, as distance may change more than that estimated by eNB due to processing and transmission delays. Frequent $t_P$ updates also means better accuracy if motion pattern is non-linear or irregular, as relative distance may be more accurately measured, and then provided TOA based TA values may be more accurate.

Figure 3:
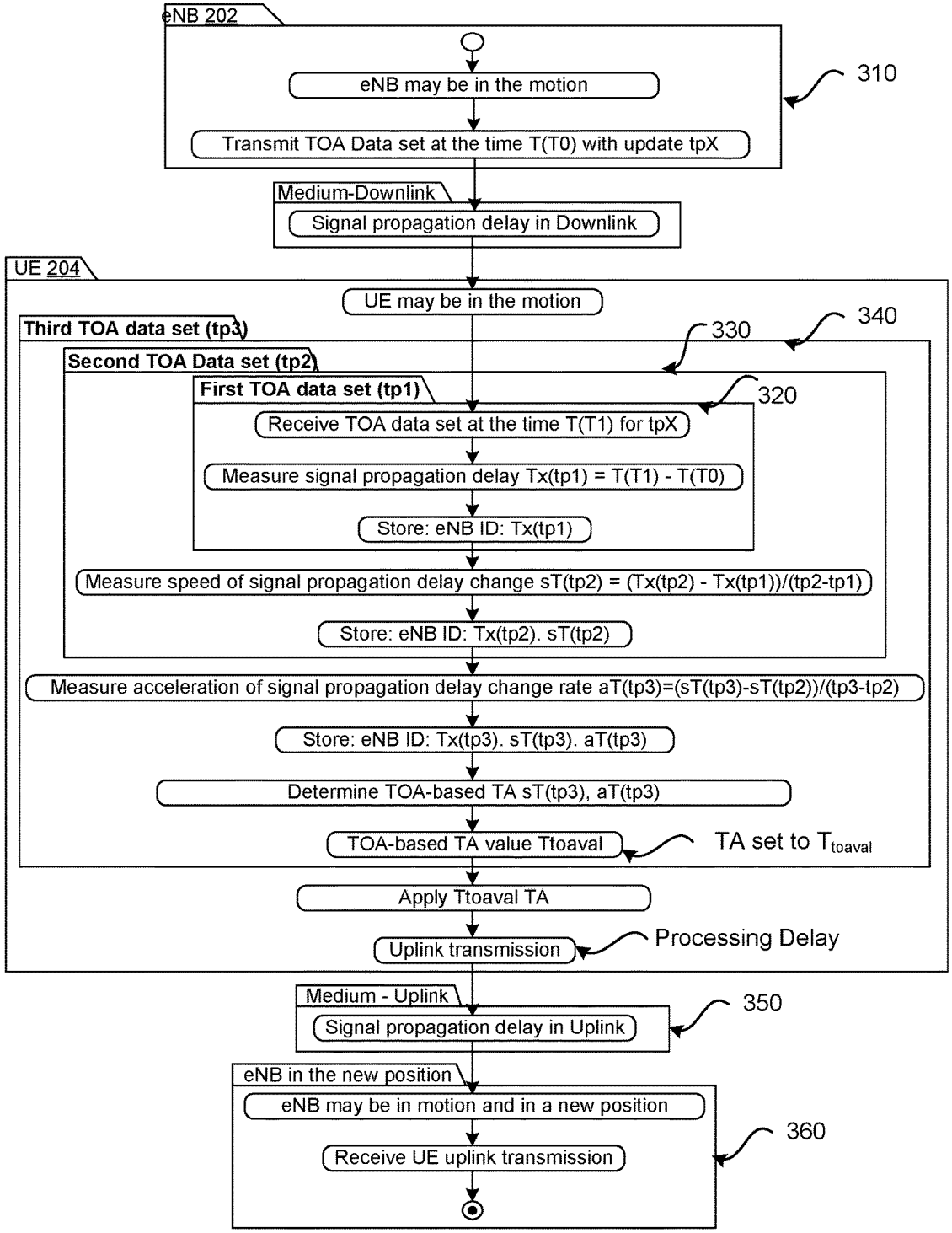
FIG. 3 illustrates an activity diagram for using time of arrival (TOA) based $T_{TOAVAL}$ value as timing advance (TA) value for uplink channel synchronization, according to an additional example implementation.

FIG. 3 illustrates an activity diagram 300 for using time of arrival (TOA) based $T_{TOAVAL}$ value as a timing advance (TA) value, according to an additional example implementation.

In some implementations, for example, at 310, eNB 202 may be in motion and may be configured to transmit (e.g., broadcast) TOA related data, also referred to as TOA data set, to UE 204 (UE 202 may be in motion as well in some implementations).

At 320, UE 204 may receive a first TOA data set, tp1, sent at time $T_0$ from the eNB. In an example implementation, the first TOA data set tp1 may include transmission time $T_0$ and/or update time period $t_P$. UE 204 may receive the first TOA data set tp1 at time $T_1$. Upon receiving the first TOA data set tp1, UE 204 may determine the propagation delay, e.g., a first propagation delay, $T_{TOA}$ (tp1=0), and $T_{TOA1}$ may be used to describe first TOA distance measurement. In an example implementation, the propagation delay for $T_{TOA}$ (tp1=0) may be determined based on [Eq. 1], for example, ($T_1$-$T_0$), and stored at the UE.

After a time period $t_P$, at 330, UE 204 may receive a second TOA data set, tp2. Upon receiving the second TOA data set tp2, UE 204 may determine the propagation delay, e.g., a second propagation delay, $T_{TOA}$ (tp2=0+tp1) based on [Eq. 1]. It should be noted that the that the next measurement is performed after agreed update period, e.g., $t_P$. In some implementations, for example, UE 204 may also determine speed of relative distance change, $sT_X(X)$), $T_{TOA}$ (X=2), based on for example, [Eq. 2], and stored at the UE. It should be noted that at least two independent measurements are necessary to estimate the speed of propagation delay change.

After an additional time period $t_P$, at 340, UE 204 may receive a third TOA data set, tp3. Upon receiving the third TOA data set tp3, UE 204 may determine the acceleration of relative distance change, $aT_X(X)$, based on, for example, [Eq. 5]. In some implementations, for example, TOA based TA drift prediction and compensation may be possible, as $aT_X(X)$ vector (e.g., value/direction) may be determined.

$$aT_{TOA}(X) = (sT_X(X) - sT_{X-1}(X-1))/t_{P(X-(X-1))} \quad [\text{Eq. 5}]$$

That is, once acceleration/deceleration rate of relative distance change is determined, it may be possible to predict and/or compensate the value at the time of its applicability. For example, when such uplink transmission reaches eNB, it may be fully synchronized, even if the distance change is changing frequently. The compensation mechanism may use the UE's last position (e.g., last distance measurement) and add necessary correction based on motion pattern.

In some implementations, for example, UE 204 may use $aT_X(X)$ characteristics to determine TOA based $T_{TOAVAL}$ values, which may replace TA in TA budget as UE may be provided with relative distance change patterns. In addition, the UE may apply proper uplink correction values to compensate for eNB motion so that UE uplink transmission (for example, transmitted from UE 204 to eNB 202 at 350) may reach the eNB at new location with full synchronization, for example, at 360. Such TA drift prediction may be necessary for the next uplink transmission and not as it is currently used for TA where changes are applied from 6th TTI. In other words, UE may receive TA correction from eNB for uplink channel synchronization. Using TOA method, UE may calculate TOA-based distance to eNB, which may be then converted to TA index value form. Due to better accuracy ($T_s$), this method may be more accurate. TOA TA may substitute TA value received from eNB. TOA based Timing Advance (TA) may include processing (e.g., constant) and transmission (e.g., depends on a distance) delays to ensure that such uplink transmission will reach the receiver (e.g., eNB at proper time, e.g., fully synchronized, even in motion).

In some implementations, for example, an eNB that may be receiving uplink transmissions that use TOA based $T_{TOAVAL}$ value as TA value may be unaware such procedure was used by the UE as no additional signaling to the eNB is needed or transmitted. The UE uplink transmissions received at the eNB may be then correctly decoded as no TA drift will be present (or within tolerance limits). As illustrated, high or very-high speed of UE, eNB, or both may be successfully compensated for RRC connection establishment and/or maintenance of the connection.

In some implementations, for example, the above described mechanism/procedure may require at least 3 TOA data sets to be considered during relatively short update time period $t_P$. In addition, as the UE may receive eNB broadcasts before an RRC connection is requested (e.g., terrestrial wireless networks), the proposed mechanism/procedure may not delay connection establishment. In other words, three TOA data sets may be required if relative distance change pattern is irregular. However, the UE may receive necessary TOA data sets before the RRC connection is requested so that there may be no delay (e.g., additional delay) in establishing the connection. It should be noted that the delay may last up to 3 tp if exact value is needed (or 3 measurements—2 tp, counting time between 3 independent measurements).

Moreover, the proposed mechanism/procedure does not require positioning reports and is based on signal propagation delays (or signal propagation delay measurements). An advantage of this approach is that any changes in the propagation medium (e.g., vacuum, air) in signal propagation delays are naturally compensated. In addition, the position of the UEs is not revealed (e.g., UE's position not reported to the eNB in order to establish the connection).

In some implementations, for example, when position-based mechanism for uplink channel synchronization is considered: a relative distance between eNB and UE (when both in motion) may be determined if both eNB (X, Y, Z) and UE (X, Y, Z) coordinates are known. In such a scenario, for example, a distance may be calculated based on [Eq. 6], and it may be described as position-based TA correction.

$$D_{UE\,eNB}(X, Y, Z) = \sqrt{(X_{eNB} - X_{UE})^2 + (Y_{eNB} - Y_{UE})^2 + (Z_{eNB} - Z_{UE})^2} \quad [\text{Eq. 6}]$$

In some implementations, the position-based mechanism described above may be used for verification and antenna gain optimization.

In some implementations, for example, the TOA based uplink channel synchronization may be used for TOA based TA $T_{TOAVAL}$ value as a substitute or replacement of TA provided by eNB.

The TOA method described above may provide distance estimation with accuracy $T_s$ which may be, in some implementations, for example, 16 times better than TA (e.g., due to granularity of TA correction. That is, the uplink channel may be synchronized with the downlink channel with an accuracy of $T_s$. Moreover, the UE may apply such correction autonomously and there is no need for the UE to wait for MAC CE Updates from the eNB. Therefore, as described above, the use of TOA based $T_{TOAVAL}$ value as TA value may be used for uplink channel synchronization.

FIGS. 4A-4H illustrate $sT_X(X)$ function in various scenarios, according to some example implementations. In an example implementation, the prediction of TOA based values may be determined as specified in $aT_X(X)$ where information about changes of the speed in a given time may indicate an acceleration of such change. It should be noted that the mechanisms/procedures described in this disclosure may also be used to compensate predicted TA drift in uplink transmission based on change history and function. As illustrated in FIGS. 4A-4H, the mechanisms/procedures described in the present disclosure may be applied for various other scenarios as well, including, for example, ground based mobile network applications (e.g., terrestrial network applications) and non-terrestrial network applications (e.g., FIG. 2A).

In some implementations, for example, FIGS. 4A and 4B illustrate $sT_X(X)$ (410, 420) for maneuvering (e.g., motion pattern may change rapidly) and accelerating objects, according to some example implementations.

Figure 4D:
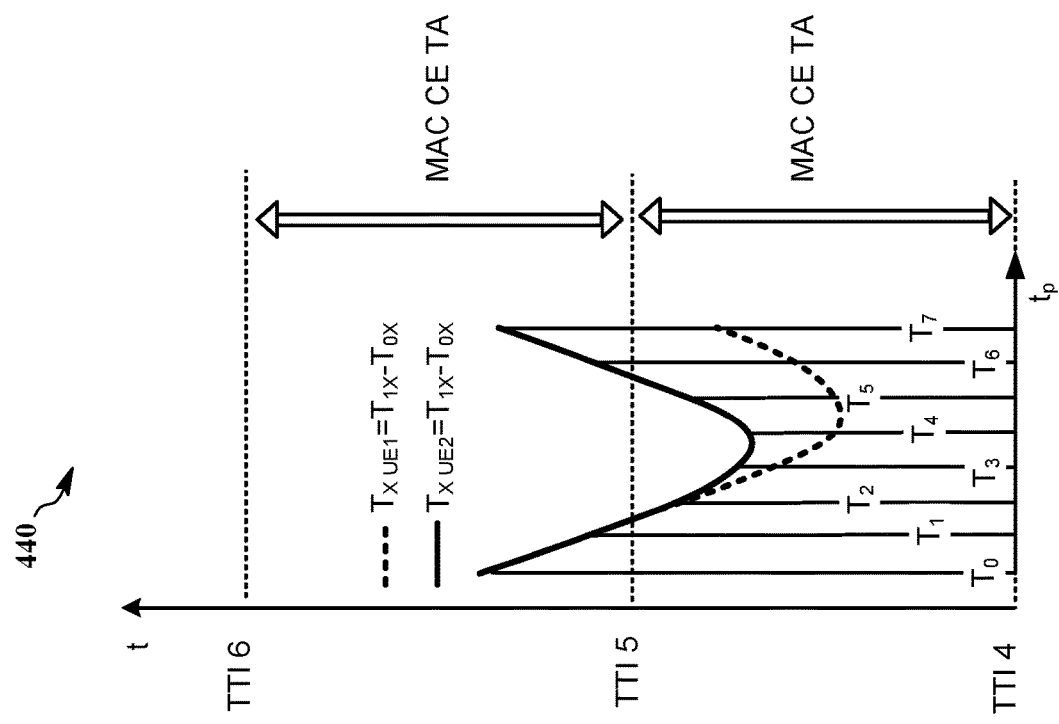
Figure 4C:
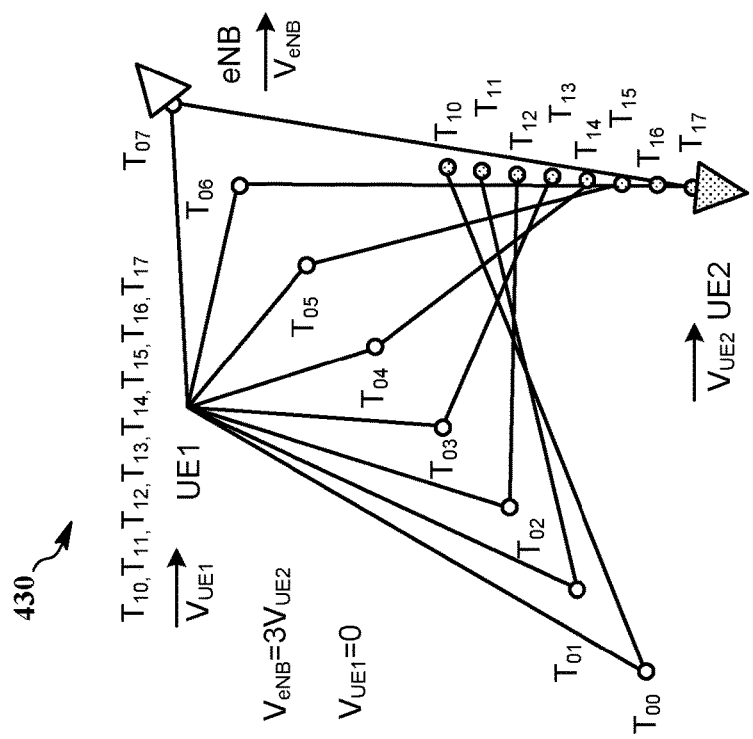

In some implementations, for example, FIGS. 4C and 4D illustrate $sT_X(X)$ (430 and 440) for eNB/UE with constant speeds but different heading or eNB with constant speed and a static UE, according to some example implementations.

In some implementations, for example, FIGS. 4E and 4F illustrate $sT_X(X)$ (450 and 460) for static eNB and moving UE (reference to a terrestrial wireless network), according to some example implementations.

Figure 4G:
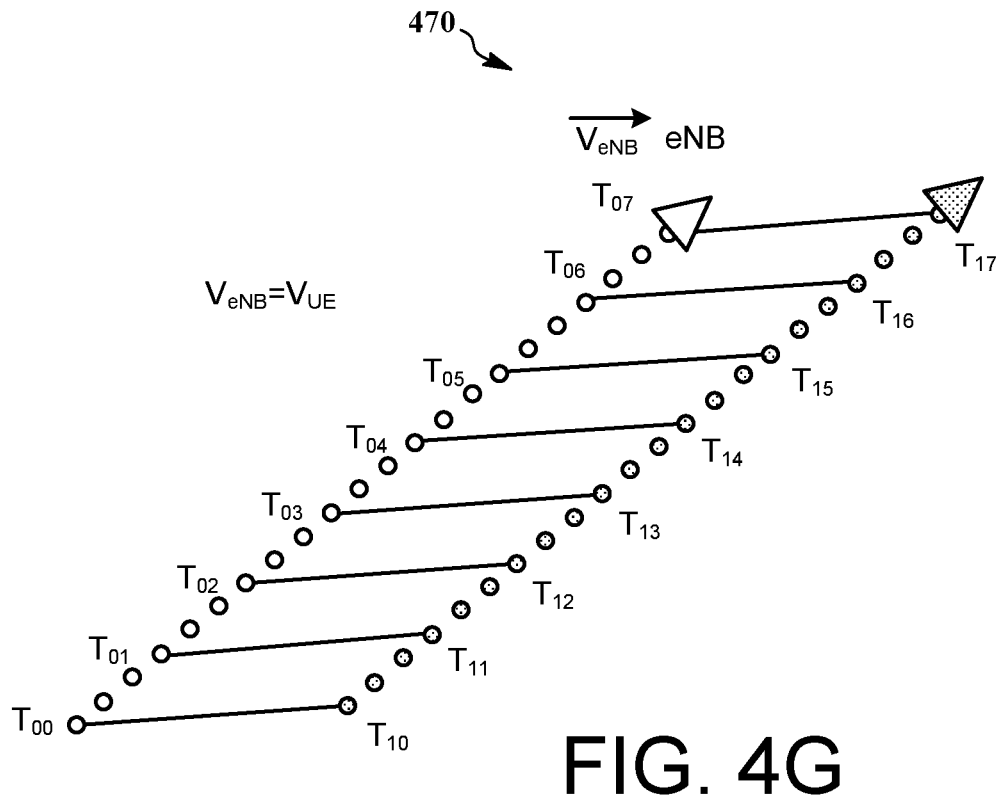
Figure 4H:
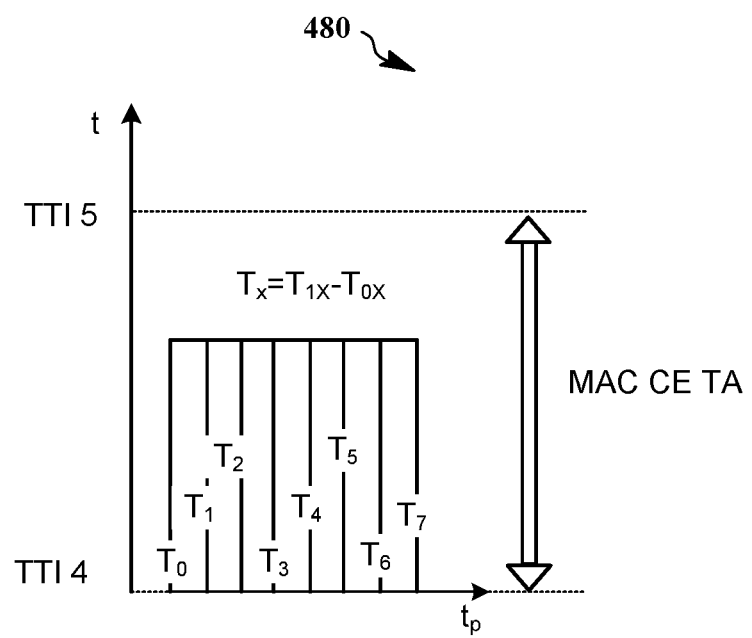

In some implementations, for example, FIGS. 4G and 4H illustrate $sT_X(X)$ (470 and 480) for two moving objects with no differences in relative speed and distance.

Figure 5:
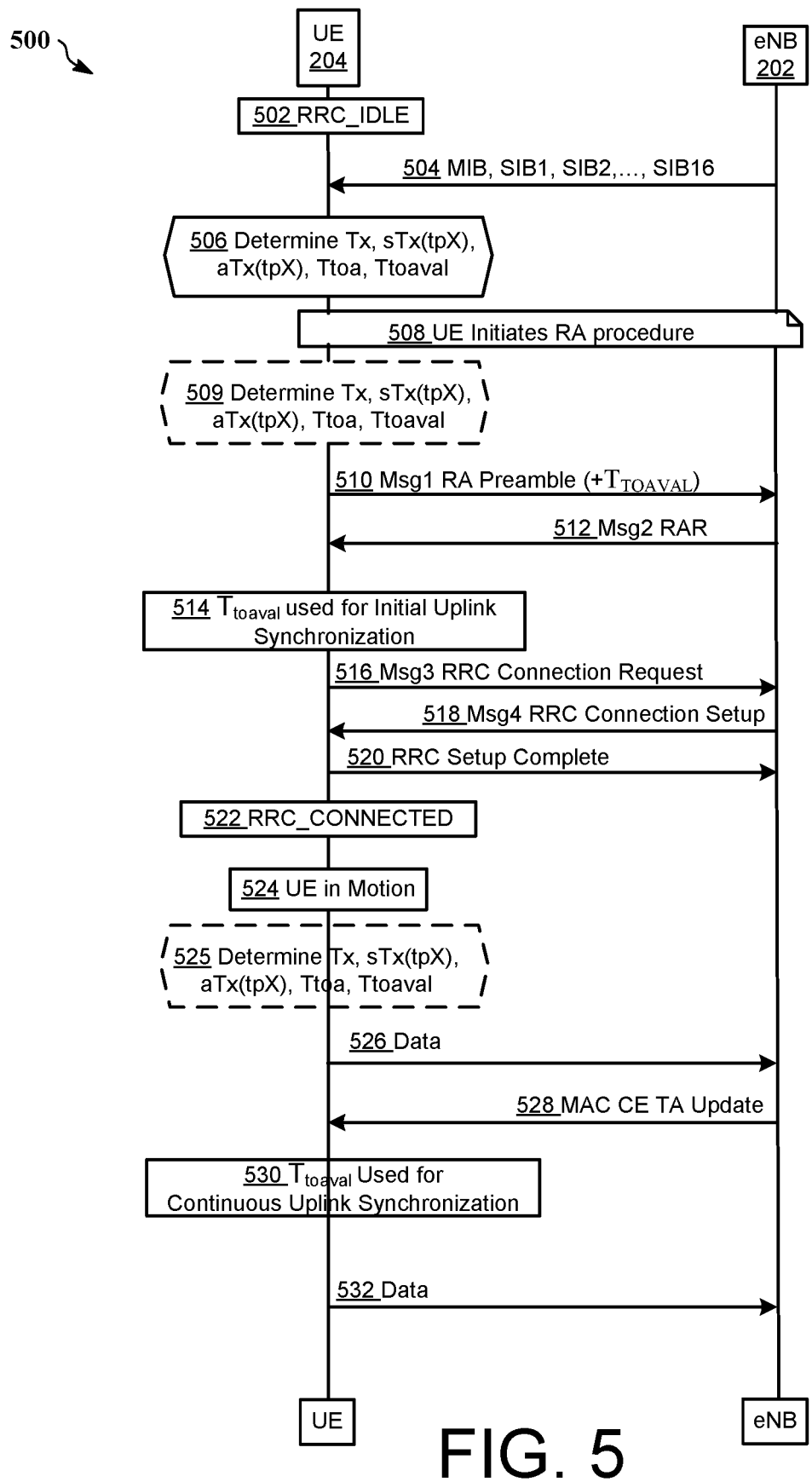
FIG. 5 is a flow diagram illustrating the use of time of arrival (TOA) based $T_{TOAVAL}$ value as timing advance (TA) value for uplink channel synchronization, according to an example implementation.

FIG. 5 is a flow diagram 500 illustrating the use of time of arrival (TOA) $T_{TOAVAL}$ value as Timing Advance (TA) value for uplink channel synchronization, according to an example implementation.

At 502, UE 204 may be in a radio resource control (RRC)_IDLE state.

At 504, UE 204 may receive master information block (MIB) and/or system information blocks (SIBs may include SIB1, SIB2, SIB3, . . . , and SIB16) from eNB 202. eNB 202, in an example implementation, may broadcast the MIB on a physical broadcast channel (PBCH) and the SIBs on a physical downlink shared channel (PDSCH), via RRC messages.

In some implementations, for example, a SIB (for example, SIB16) may include TOA data set(s). A TOA data set may include signal physical transmission times (e.g., $T_0$) and/or an update time period $t_P$, as described above in reference to FIG. 3.

At 506, UE 204 may determine, for example, one or more of $T_X$, $sT_X(X)$, $aT_X(X)$, $T_{TOA}$, $T_{TOAVAL}$, etc. (as described in reference to FIGS. 2A-2C (above) and FIGS. 4A-4H and 6 (below)) based on TOA data set (e.g., first, second, third data sets as described above in reference to FIG. 3) and/or other information (e.g., signal physical reception time, etc.) available at the UE.

At 508, UE 204 may initiate a random access (RA) procedure, for example, to transition the UE from RRC_IDLE state to RRC_CONNECTED state (or any other state that is not an RRC_IDLE state). In some implementations, for example, the UE may initiate RA procedure in response to data being available for transmission from the UE (or due to any other trigger as defined in 3GPP Specifications). The RA procedure may be used by the UE to synchronize with the network (e.g., cells). In some implementations, the RA procedure may be a four-step RA procedure or a two-step RA procedure depending on configuration.

In an example implementation, the four-step RA procedure may include Messages 1, 2, 3, and/or 4 (also referred to as Msg1, Msg2, Msg3, and Msg4) exchanged between UE 204 and eNB 202 as following: a) Msg1—UE 204 selects one of the available preambles and sends it to the eNB, for example, using a random access radio network temporary identity (RA-RNTI) as an identifier; b) Msg2—eNB 202 sends random access response (RAR) to the UE on a downlink shared channel (DL-SCH) addressed to the RA-RNTI calculated from the timeslot in which the preamble was sent. In some implementations, the Msg2 may include the following information: temporary cell-RNTI (C-RNTI)—eNB gives another identity to UE which is called temporary C-RNTI (cell radio network temporary identity) for further communication; Timing Advance Value: eNB informs the UE to change its timing so the UE can compensate for the delay caused due to the distance between the UE and eNB; and Uplink Grant Resource: eNB will assign initial resource to the UE so that the UE can use UL-SCH (uplink shared channel); c) Msg3—Using UL-SCH, the UE may send RRC connection request message to the eNB. The UE may be identified by temporary C-RNTI (assigned previously by the eNB). In some implementations, Msg3 may include the following—UE identity (TMSI or Random Value)—the TMSI may be used if the UE has previously connected to the same network. With the TMSI value, the UE may be identified in the core network; random value is used if the UE is connecting for the very first time to network. The random value or the TMSI may be needed as the temporary-CRNTI may have been assigned to more than one UEs previously, due to multiple requests coming at same time; and connection establishment cause: this shows the reason why the UE needs to connect to network; d) Msg4—eNB responds with contention resolution message to the UE whose message was successfully received in Step 3. This message is addressed towards the TMSI value or random number (from previous steps) but may include the new C-RNTI which may be used for the further communication.

In another example implementation, the two-step RA procedure may include two messages, Messages A and B (referred to as MsgA and MsgB respectively). In some implementations, in the two-step RACH procedure, MsgA may include Msg. 1 (preamble signal) and Msg3 (data signal) of the four-step RACH procedure and MsgB may include Msg2 (random access response) and Msg4 (contention resolution) of the four-step RA procedure.

At 509, UE 204 may determine, for example, one or more of $T_X$, $sT_X(X)$, $aT_X(X)$, $T_{TOA}$, $T_{TOAVAL}$, etc. (as described in reference to FIGS. 2A-2C (above) and FIGS. 4A-4H and 6 (below)), similar to 506 above, but based on a most up to date TOA data set (e.g., a second data set as described above in reference to FIG. 3) and/or other information (e.g., signal physical reception time, etc.) available at the UE. It should be noted that 509 is shown in FIG. 5 to indicate that the most up to date TOA measurements are used for RRC. This (three independent measurements for calculating values) is not intended as a limitation. In fact, it may be considered as a continuous process and the most up to date values may be used, if needed for RRC. In the case of RA, one TOA data set may be sufficient to initiate RACH procedure. However, in a high speed scenario, UE needs to know the pattern of relative distance change. If the relative distance changes rapidly, it may mean that traditional random access procedure may be inefficient to establish RRC connection due to high TA drift, as initially provided TA correction value may be out of date at the time of applicability. Then, the UE may use TOA TA for random access procedure. By having 3 TOA data sets, the UE may predict required TA (and finally uplink channel timing adjustment) more accurately.

In some implementations, for example, UE 204 may determine TOA index value based on [Eq. 7] when the distance between UE 204 and eNB 202 changes rapidly and based on [Eq. 8] when the distance between UE 204 and eNB 202 does not change rapidly, as shown below. It should be noted that, for simplification, application of TOA $T_{TOAVAL}$ value may be considered as application of TOA $T_{TOA}$ value, where selection may be done per specified criteria, such as a rapid relative distance chance value.

$$T_{toa} = int\left[\frac{sT_{X-1}(X-1)*tpX + \frac{aT_{TOA}(X)*tpX^2}{2}}{1T_A}\right] \quad [\text{Eq. 7}]$$

$$T_{toaval} = int\left[\frac{c*(T_{1X} - T_{0X})}{1T_A}\right] \quad [\text{Eq. 8}]$$

It should be noted that, for simplification, application of TOA $T_{TOAVAL}$ value may be considered as application of TOA $T_{TOA}$ value, where selection may be done per specified criteria, such as a rapid relative distance chance value.

At 510, UE 204 may send Msg1 of the four-step RA procedure to eNB 202. As described above, Msg1 of the RA procedure includes an RA preamble.

Optionally, in some implementations, for example, UE 204 may include $T_{TOAVAL}$ value in Msg1. In some implementations, eNB 202 may use the $T_{TOAVAL}$ value received from the UE for adjusting the TA correction index values for the following uplink transmissions, as comparison may indicate TA drift rate. For example, UE may report TOA TA=100, whereas eNB may calculate TA=98. Assuming both methods are precise, this may indicate that the UE may be approaching the eNB (e.g., UE moving towards eNB) as there may be some delay between the independent measurements. This may be especially important if due to TA drift, UE cannot successfully complete the random access procedure, e.g., even if UE applies provided TA value, its value may be out of date (e.g., rapid case scenario). In addition, in some implementations, for example, the eNB may validate $T_{TOAVAL}$ values received from the UE node, the validation being performed based at least on the TA values generated at the eNB.

Optionally, in some implementations, for example, if UE 204 includes $T_{TOAVAL}$ value in Msg1, it may indicate that UE 204 may be capable to use TOA $T_{TOAVAL}$ value for uplink to downlink channel timing adjustment. That is, TA correction value received in eNB TA command may be not used or may be omitted, and UE 204 may be responsible for provision and maintaining uplink channel synchronization.

At 512, UE 204 may receive Msg2 of the four-step RA procedure from eNB 202. As described above, Msg2 of the RA procedure includes RA response.

In some implementations, for example, the RAR/Msg2 may include a TA command which may contain a TA correction value, which may be verified by $T_{TOAVAL}$ or may include $T_{TOAVAL}$. In some implementations, if UE 204 supports TOA method, TA command may be omitted.

At 514, UE 204 may apply $T_{TOAVAL}$ value as a substitute for the TA index value received as shown below in [Eq. 9] if relative distance does not change rapidly and UE 204 may apply $T_{TOA}$ value as shown below in [Eq. 10] if relative distance changes rapidly. In an example implementation, $T_{TOA}$ value may be determined based on [Eq. 7]. In another example implementation, $T_{TOAVAL}$ value may be determined based on [Eq. 8].

At 516, UE 204 may send Msg3 to UE 202. As described above, Msg3 of the RA procedure may be an RRC connection request.

At 518, UE 204 may receive Msg4 from eNB 202. As described above, Msg 4 of the RA procedure includes RRC connection set up message.

At 520, UE 204 sends RRC setup complete message to eNB 202 upon successful reception of Msg4 (and or any related configuration based on Msg4).

At 522, upon reception of the Msg4 from eNB 202, UE 204 transitions to RRC_CONNECTED state.

At 524, in some implementations, for example, UE 204 may be in motion.

At 525, UE 204 may determine, for example, one or more of $T_X$, $sT_X(X)$, $aT_X(X)$, $T_{TOA}$, $T_{TOAVAL}$, etc. (as described in reference to FIGS. 2A-2C (above) and FIGS. 4A-4H and 6 (below)), similar to 506/509 above, but based on a newer (most up to date) TOA data set as described above in reference to FIG. 3 and/or other information (e.g., signal physical reception time, etc.) available at the UE. This indicates that TOA based $T_{TOAVAL}$ value application process is a continuous process, the values may be different, and the values may be applied more frequently but directly, without additional signaling as in case of MAC CE TA Update.

At 526, UE 204 may transmit uplink data to eNB 202. In some implementations, for example, UE 204 may transmit uplink data based on TOA TA correction index value. Uplink to downlink channel timing adjustment may be based on [Eq. 9] or [Eq. 10], where selection may depend on relative distance change value criteria.

At 528, UE 204 may receive media access control (MAC) control element (CE) TA updates from eNB 202. The MAC CE TA updates are required at the UE for continuous synchronization of the uplink. In an example implementation, the MAC CE TA updates are sent to the UE when the UE is in RRC_CONNECTED state.

At 530, UE 204 may apply $T_{TOAVAL}$ or $T_{TOA}$ values for continuous uplink synchronization based on, for example, [Eq. 9] and [Eq. 10], as shown below:

$$N_{TOA} = T_{toaval} * 16 * T_S[s] \qquad [\text{Eq. 9}]$$

$$N_{TOA}2 = T_{toa} * 16 * T_S[s] \qquad [\text{Eq. 10}]$$

In some implementations, for example, eNB may measure quality of UE uplink channel synchronization and may trigger MAC CE TA update if synchronization needs to be maintained. As synchronization may be continuously achieved by TOA based TA correction, MAC CE TA update may not be triggered or may be triggered less frequent.

At 532, UE 204 may transmit uplink data to eNB 202. In some implementations, for example, UE 204 may transmit uplink data based on TOA TA index value determined at 530.

Therefore, as described above, TOA based $T_{TOAVAL}$ or $T_{TOA}$ index value may be used as TA index value for uplink channel synchronization for transmitting data on the uplink from UE 204 to eNB 202.

Figure 6:
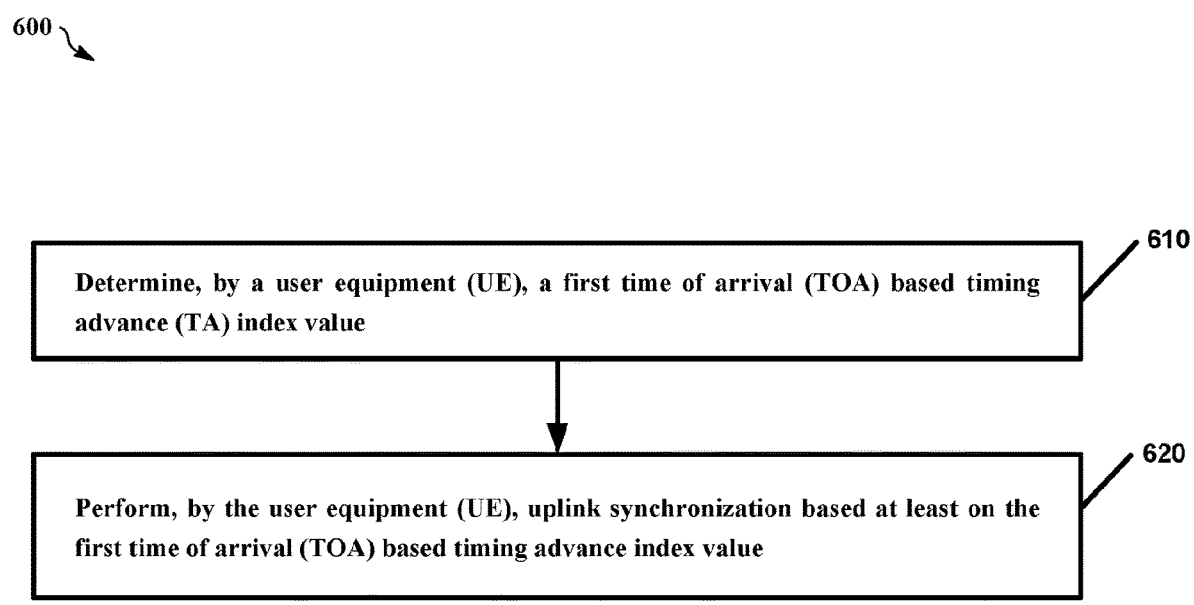
FIG. 6 is a flow diagram illustrating using time of arrival (TOA) based $T_{TOAVAL}$ value as timing advance (TA) value for uplink channel synchronization, according to an example implementation.

FIG. 6 is a flow diagram 600 illustrating using time of arrival (TOA) based $T_{TOAVAL}$ value as timing advance (TA) index value, according to an example implementation.

At block 610, a UE (e.g., UE 204) may determine a first time of arrival (TOA) based timing advance (TA) index value. In some implementations, for example, UE 204 may determine the first TOA based timing index value (as described above in reference to FIG. 5) based on [Eq. 8] when the distance between UE 204 and eNB 202 does not change rapidly and based on [Eq. 7] when the distance between UE 204 and eNB 202 changes rapidly.

In some implementations, for example, "rapid" movement may be defined as a relative distance change of more than 1TA (78 m) per second (e.g., more more than 1 MAC TA update per second may be needed in such a case).

At block 620, UE 204 may perform uplink synchronization based at least on the first time of arrival (TOA) based timing advance index value. In some implementations, for example, uplink to downlink synchronization may be determined based on [Eq. 9] or [Eq. 10].

It should be noted that, in some implementations, the TA command transmitted by the eNB 202 in Msg2/MsgB of RA procedure and/or MAC CE TA Updates may be omitted (e.g., skipped, not transmitted, etc.) in the downlink transmissions from the eNB as the UE may use $T_{TOAVAL}$ or $T_{TOA}$ value as a timing advance (TA) index value.

In some implementations, for example, $T_{TOAVAL}$ value(s) calculated by the UE may be reported to the eNB to provide feedback for any other applications/services which may be based on information about TA value(s) being available at eNB level. In some other implementations, for example, $T_{TOAVAL}$ value(s) may be reported as part of control signaling.

In some implementations, for example, eNB 202 may not calculate or process timing advance TA correction value for a UE supporting TOA TA values.

Thus, uplink channel synchronization for transmission of data from the UE to the eNB may be achieved.

Example 1. A method of communications, comprising: determining, by a user equipment (UE), a first time of arrival (TOA) based timing advance index value; and performing, by the user equipment (UE), uplink synchronization based at least on the first time of arrival (TOA) based timing advance index value.

Example 2. The method of claim 1, further comprising: determining, by the user equipment (UE), one or more second time of arrival (TOA) based timing advance index values; and performing, by the user equipment (UE), continuous uplink synchronization based at least on the one or more second time of arrival (TOA) based timing advance index values, the continuous uplink synchronization performed when the user equipment (UE) is in a radio resource control (RRC) CONNECTED mode.

Example 3. The method of one of claim 1, further comprising: transmitting, by the user equipment (UE), the first time of arrival (TOA) based timing advance index value to the network node.

Example 4. The method of claim 2, further comprising: transmitting, by the user equipment (UE), the one or more second time of arrival (TOA) based timing advance index values to the network node.

Example 5. The method of claim 1, further comprising: determining whether a distance between the user equipment (UE) and the network node is changing rapidly; determining, in response to determining that the distance between the user equipment (UE) and the network node is changing rapidly, the first time of arrival (TOA) TA index value based on [Eq. 7].

Example 6. The method of claim 1, further comprising: determining whether a distance between the user equipment (UE) and the network node is changing rapidly; determining, in response to determining that the distance between the user equipment (UE) and the network node is not changing rapidly, the first time of arrival (TOA) TA index value based on [Eq. 8].

Example 7. The method of claim 1, wherein the first time of arrival (TOA) based timing advance index value is transmitted to the network node via a radio resource control (RRC) connection request message of a random access procedure initiated by the user equipment (UE).

Example 8. The method of claim 7, wherein the message is Msg 1 of the random access procedure, and wherein the random access procedure is a four-step random access procedure.

Example 9. The method of claim 7, wherein the message is Msg A of the random access procedure, and wherein the random access procedure is a two-step random access procedure.

Example 10. The method of claim 2, wherein the one or more second time of arrival (TOA) based timing advance index values are transmitted to the network node via user's data when the user equipment (UE) is in a radio resource control.(RRC) CONNECTED state.

Example 11. An apparatus comprising at least one processor and at least one memory including computer instructions, when executed by the at least one processor, cause the apparatus to perform a method of any of Examples 1-10.

Example 12. An apparatus comprising means for performing a method of any of Examples 1-10.

Example 13. A non-transitory computer-readable storage medium having stored thereon computer executable program code which, when executed on a computer system, causes the computer system to perform the steps of any of Examples 1-10.

Example 14. A method of communications, comprising: determining, by a network node, a first timing advance (TA) correction value; receiving, by the network node, a first time of arrival (TOA) based timing advance index value from a user equipment (UE); and validating, by the network node, the first time of arrival (TOA) based timing advance index value received from the user equipment (UE), the validating based at least on comparing the first time of arrival (TOA) based timing advance (TA) index value and the first timing advance (TA) value.

Example 15. The method of claim 14, further comprising: receiving, by the network node, a second time of arrival (TOA) based timing advance index value from the user equipment (UE); and validating, by the network node, the second time of arrival (TOA) based timing advance index value received from the user equipment (UE), the validating based at least on comparing the second time of arrival (TOA) based timing advance (TA) index value and the second timing advance (TA) value.

Example 16. The method of claim 14, wherein the first time of arrival (TOA) based timing advance index value is received from the user equipment (UE) during a random access procedure.

Example 17. The method of claim 15, wherein the second time of arrival (TOA) based timing advance is received from the user equipment (UE) when the user equipment (UE) is in a radio resource control (RRC)_CONNECTED state.

Example 18. An apparatus comprising at least one processor and at least one memory including computer instructions, when executed by the at least one processor, cause the apparatus to perform a method of any of Examples 14-17.

Example 19. An apparatus comprising means for performing a method of any of Examples 14-17.

Example 20. A non-transitory computer-readable storage medium having stored thereon computer executable program code which, when executed on a computer system, causes the computer system to perform the steps of any of Examples 14-17.

Figure 7:
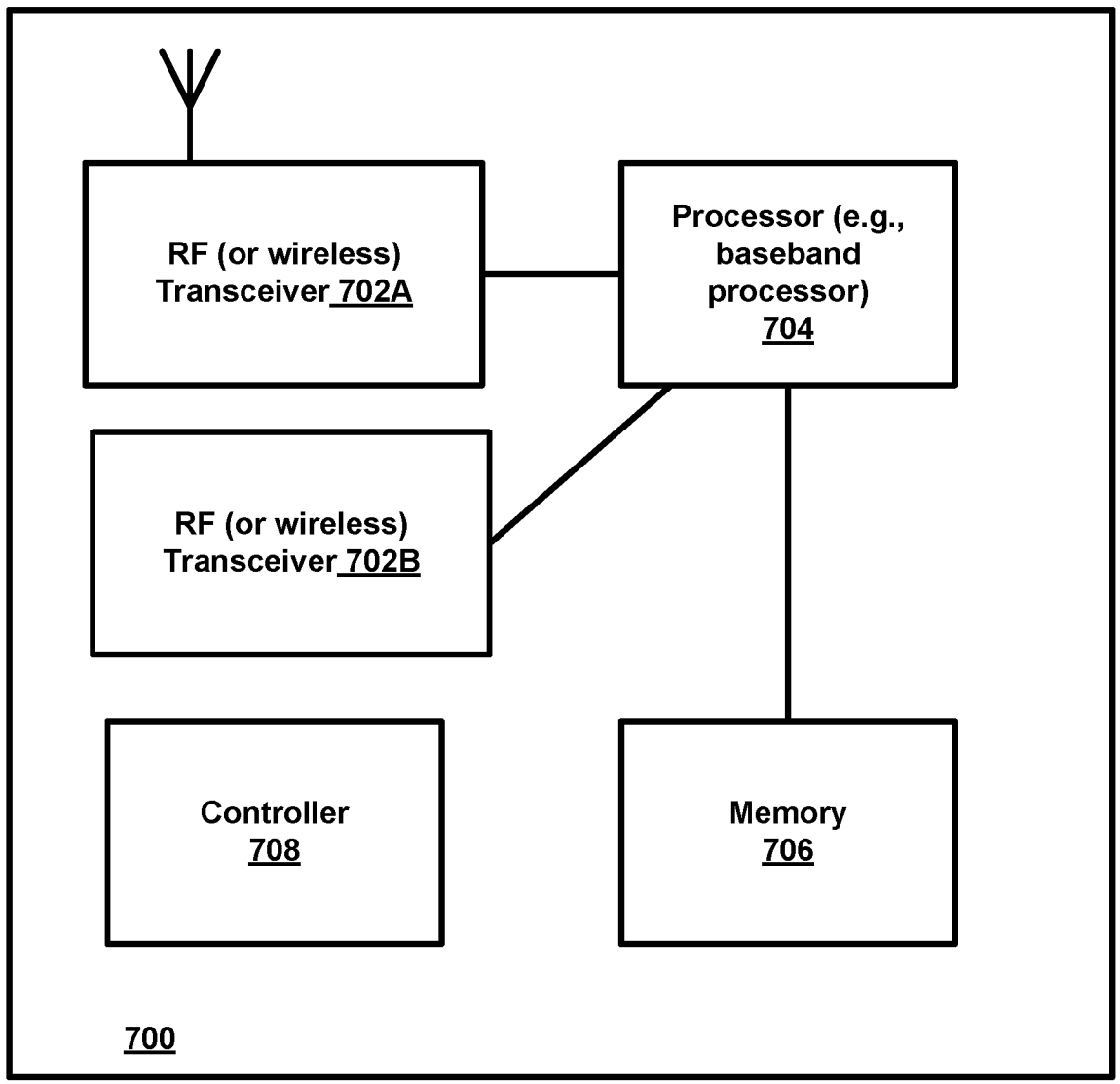
FIG. 7 is a block diagram of a node or wireless station (e.g., base station/access point or mobile station/user device/UE), according to an example implementation.

FIG. 7 is a block diagram of a wireless station (e.g., user equipment (UE)/user device or AP/gNB/MgNB/SgNB) 700 according to an example implementation. The wireless station 700 may include, for example, one or more RF (radio frequency) or wireless transceivers 702A, 702B, where each wireless transceiver includes a transmitter to transmit signals and a receiver to receive signals. The wireless station also includes a processor or control unit/entity (controller) 704/708 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software. Moreover, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. An apparatus comprising:
   at least one processor; and
   at least one memory including computer program code;
   the at least one memory and the computer program code configured to, with the at least one processor, cause the apparatus at least to:
   determine a first time of arrival based timing advance index value;
   perform uplink synchronization based at least on the first time of arrival based timing advance index value;
   determine whether a distance between the apparatus and a network node is changing faster than a predetermined threshold; and
   determine, in response to determining that the distance between the apparatus and the network node is changing faster than the predetermined threshold, the first time of arrival timing advance index value based on $$T_{toa} = \text{int}\left[\frac{sT_{X-1}(X-1)*tpX + \frac{aT_{TOA}(X)*tpX^2}{2}}{1T_A}\right];$$

or determine, in response to determining that the distance between the apparatus and the network node is not changing faster than the predetermined threshold, the first time of arrival timing advance index value based on $$T_{toaval} = \text{int}\left[\frac{c*(T_{1X} - T_{0X})}{1T_A}\right].$$

2. The apparatus of claim 1, wherein the at least one memory and the computer program code configured to, with the at least one processor, cause the apparatus at least to:
   transmit the first time of arrival based timing advance index value to a network node.

3. The apparatus of claim 1, wherein the first time of arrival based timing advance index value is transmitted to a network node via a radio resource control connection request message of a random access procedure initiated by the apparatus.

4. The apparatus of claim 3, wherein the message is Msg 1 of the random access procedure, and wherein the random access procedure is a four-step random access procedure.

5. The apparatus of claim 3, wherein the message is Msg A of the random access procedure, and wherein the random access procedure is a two-step random access procedure.

6. The apparatus of claim 1, wherein the at least one memory and the computer program code configured to, with the at least one processor, cause the apparatus at least to:
   determine one or more second time of arrival based timing advance index values; and
   perform continuous uplink synchronization based at least on the one or more second time of arrival based timing advance index values, the continuous uplink synchronization performed when the apparatus is in an RRC_CONNECTED mode.

7. The apparatus of claim 6, wherein the at least one memory and the computer program code configured to, with the at least one processor, cause the apparatus at least to:
   transmit the one or more second time of arrival based timing advance index values a network node.

8. The apparatus of claim 6, wherein the one or more second time of arrival based timing advance index values are transmitted to the network node via user's data when the apparatus is in an RRC_CONNECTED state.

9. The apparatus of claim 6, wherein the apparatus comprises at least part of a user equipment.

10. A method of communications, comprising:
    determining, by a user equipment, a first time of arrival based timing advance index value;
    performing, by the user equipment, uplink synchronization based at least on the first time of arrival based timing advance index value;
    determining whether a distance between the user equipment and the network node is changing rapidly; and
    determining, in response to determining that the distance between the user equipment and the network node is changing rapidly, the first time of arrival timing advance index value based on $$T_{toa} = \text{int}\left[\frac{sT_{X-1}(X-1)*tpX + \frac{aT_{TOA}(X)*tpX^2}{2}}{1T_A}\right];$$

or
determining, in response to determining that the distance between the user equipment and the network node is not changing rapidly, the first time of arrival timing advance index value based on $$T_{toaval} = \text{int}\left[\frac{c*(T_{1X} - T_{0X})}{1T_A}\right].$$

11. The method of claim 10, further comprising:
    determining, by the user equipment, one or more second time of arrival based timing advance index values; and
    performing continuous uplink synchronization based at least on the one or more second time of arrival based timing advance index values, the continuous uplink synchronization performed when the user equipment is in an RRC_CONNECTED mode.

12. The method of claim 11, further comprising:
    transmitting, by the user equipment, the one or more second time of arrival based timing advance index values to a network node.

13. The method of claim 10, further comprising:
    transmitting, by the user equipment, the first time of arrival based timing advance index value to a network node.

14. The method of claim 10, wherein the first time of arrival based timing advance index value is transmitted to the network node via a radio resource control connection request message of a random access procedure initiated by the user equipment.

15. A non-transitory computer readable medium comprising program instructions that, when executed by an apparatus, cause the apparatus to perform at least the following:
   determining a first time of arrival based timing advance index value;
   performing uplink synchronization based at least on the first time of arrival based timing advance index value;
   determining whether a distance between the apparatus and the network node is changing rapidly; and
   determining, in response to determining that the distance between the apparatus and the network node is changing rapidly, the first time of arrival timing advance index value based on $$T_{toa} = \text{int}\left[\frac{sT_{X-1}(X-1)*tpX + \frac{aT_{TOA}(X)*tpX^2}{2}}{1T_A}\right];$$

or
   determining, in response to determining that the distance between the apparatus and the network node is not changing rapidly, the first time of arrival timing advance index value based on $$T_{toaval} = \text{int}\left[\frac{c*(T_{1X} - \tau_{0X})}{1T_A}\right].$$

16. The non-transitory computer readable medium of claim 15, wherein the program instructions further cause the apparatus to perform:
   transmitting the first time of arrival based timing advance index value to a network node.

* * * * *